United States Patent
Fahey

[15] 3,671,560
[45] June 20, 1972

[54] MANUFACTURE OF PALLADIUM OR PLATINUM-CONTAINING COMPOUNDS

[72] Inventor: Darryl R. Fahey, Bartlesville, Okla.
[73] Assignee: Phillips Petroleum Company
[22] Filed: Sept. 29, 1970
[21] Appl. No.: 76,607

[52] U.S. Cl. .......................260/429 R, 260/439 R
[51] Int. Cl. ..............................................C07f 15/00
[58] Field of Search ...............................260/429 R

[56] References Cited

UNITED STATES PATENTS 3,102,899    9/1963    Cannell...................260/439

OTHER PUBLICATIONS

Malatesta et al., J. Chem. Soc. 1957, p. 1186– 1188.
Chatt et al., J. Chem. Soc. 1961, p. 5504– 5507.

*Primary Examiner*—Tobias E. Levow
*Assistant Examiner*—A. P. Demers
*Attorney*—Young and Quigg

[57]    ABSTRACT

Compounds of the formula $M(Z_3P)_4$, where M is palladium or platinum and Z is a hydrocarbon or substituted hydrocarbon radical, are produced by reacting the metal in elemental form with a corresponding $Z_3P$ compound. One specific example is the production of tetrakis(triphenylphosphine)palladium(O) by reacting elemental palladium with triphenylphosphine.

9 Claims, No Drawings

MANUFACTURE OF PALLADIUM OR PLATINUM-CONTAINING COMPOUNDS

It is known that certain palladium, platinum and nickel-containing compounds, such as tetrakis(triphenylphosphine)palladium (O), for example, are useful as catalysts in the oligomerization of diolefins. One known method of producing compounds of this type has been to react a salt of the metal, such as palladium nitrate, with a compound such as triphenylphosphine. However, this requires that the metal initially be in the form of a salt, and results in the production of byproducts such as nitrous oxide. Another known method of producing compounds of the foregoing type involves reducing such materials as halogen-substituted triphenylphosphinepalladium compounds with hydrazine. However, this procedure also results in the production of byproducts.

In accordance with this invention, it has been found that palladium and platinum-containing compounds of the type hereinafter described in detail can be formed by the direct reaction of the metal in elemental form with an organophosphine or an organophosphite. The reaction is advantageously carried out in the presence of a hydrocarbon solvent. The compounds produced by the process of this invention are of the formula $$M(Z_3P)_4$$

where M is palladium or platinum, and each Z is Ar, ArO, R or RO, where Ar is aryl or a substituted aryl, with the substituents being alkyls having up to six carbon atoms, and R is an alkyl or Ar substituted alkyl having up to 12 carbon atoms. These compounds are produced by contacting the metal in elemental form with at least one $Z_3P$ compound at a temperature and for a time sufficient to produce the material $M(Z_3P)_4$, it being understood that the four $(Z_3P)$ constituents can be the same or different.

The elemental metal employed in the reaction can be employed in finely divided form or can advantageously be supported on an inert material such as barium sulfate or kieselguhr. The process of this invention can also be employed to recover palladium or platinum from spent catalyst where such metals are deposited on supports.

Examples of compounds $Z_3P$ which can be reacted with the metal include the following: triphenylphosphine, tri-p-tolylphosphine, diphenyl-3,4-xylylphosphine, (4-[1-hexyl]phenyl)diphenylphosphine, cyclohexyldiphenylphosphine, triphenylphosphite, tri-3,4-xylylphosphite, diphenylethylphosphite, triethylphosphine, tributylphosphine, methyldiphenylphosphine, tripropylphosphine, tridodecylphosphine, benzyldiphenylphosphine, tribenzylphosphine, methyldioctylphosphine, triphenethylphosphite, dimethoxyphenylphosphine, phenoxydimethylphosphine, triethylphosphite, dibutyldodecylphosphite, trinonylphosphite, tert-butyldioctylphosphite, and mixtures thereof.

The reaction is advantageously carried out in the presence of a hydrocarbon solvent which is inert under the reaction conditions and in which the compound to be reacted with the metal is soluble. Such hydrocarbons generally have from about 5 to 16 carbon atoms. Examples of such solvents which can be employed include benzene, toluene, cyclohexane, isooctane, xylene, dodecylbenzene, N-propylcylopentane, and mixtures thereof.

The reaction of this invention is carried out at a temperature in the general range of 0° to 150° C, with a temperature in the range of 60° to 120° C generally being preferred. The time of reaction, which is a function of the temperature employed, generally is in the range of 2 to 36 hours. The mol ratio of the compound $Z_3P$ to the metal is preferably in the range of about 100:1 to 4:1. There is no specific upper limit, except the practical consideration that is imposed by handling difficulties which result from uses of large quantities of the compound. The lower limit 4:1 is imposed by stoichometry of the process. The weight ratio of solvent to the compound $Z_3P$ is generally maintained in the range of approximately 1.35:1 to 5:1.

The tetrakis complex can be recovered by selective crystallization from the product mixture as the latter is cooled. The dilution of the product mixture by a lesser or relatively poor solvent facilitates this crystallization. Examples of such relatively poor solvents, i.e. compounds possessing less solvent power for the tetrakis complex than does the reaction solvent, include paraffin hydrocarbons, such as n-heptane, alcohols, such as methanol, and mixtures thereof. Prolonged standing at reduced temperatures also facilitates crystallization. The crystals can be collected by filtration.

Subsequent purification is often adequately attained by simple washing of the crystals on a filter employing a chilled lesser solvent as the washing agent. Recrystallization, preferably employing mixed solvents, one of which is a relatively poor solvent, further purifies the tetrakis complex. The tetrakis complexes generally are not sufficiently stable for purification by distillation or sublimation.

In one specific example of this invention, triphenylphosphine (20.0 g., 76 mmol), 5 percent by weight palladium on barium sulfate (4.0 g., 1.88 mmol of Pd), and benzene (35 ml.) were charged to a glass reactor. The mixture was purged with purified nitrogen and maintained at reflux for 28 hours. The product solution was suction filtered and the filtrate was induced to crystallize by the addition of methanol (5 ml.) and followed by chilling to 0° C. The yellow microcrystalline produce was suction filtered, washed with methanol, and promptly dried. A 0.55 g. yield of tetrakis(triphenylphosphine)palladium(O) was obtained. The material had a melting point (determined in a capillary tube open to the atmosphere) of 125°–126° C. dec. The calculated elemental analysis for $C_{72}H_{60}PdP_4$ is C, 74.8; H, 5.2. The actual analysis of the prepared material was C, 75.1; H, 5.4.

What is claimed is:

1. The method of producing a material of the formula $M(Z_3P)_4$, where M is palladium or platinum, and each Z is an Ar, ArO, R or RO, where Ar is aryl or a substituted aryl, the substituents being alkyls having up to six carbon atoms, and R is an alkyl or Ar substituted alkyl having up to 12 carbon atoms, which method comprises contacting M in elemental form with at least one $Z_3P$ compound at a temperature and for a time sufficient to produce a material $M(Z_3P)_4$.

2. The method of claim 1 wherein the contacting is carried out in the presence of a hydrocarbon in which said at least one $Z_3P$ compound is soluble.

3. The method of claim 2 wherein said material is recovered from the reaction medium by crystallization.

4. The method of claim 1 in which the contacting is for a period of 2 to 36 hours in the temperature range of 0° to 150° C.

5. The method of claim 1 in which the M is supported on a material that is inert under the contacting conditions.

6. The method of claim 1 wherein tetrakis(triphenylphosphine)palladium(0) is produced by contacting elemental palladium with triphenylphosphine.

7. The method of claim 6 wherein the contacting is carried out in the presence of benzene.

8. The method of claim 7 wherein the palladium is supported on barium sulfate.

9. The method of claim 8 wherein the contacting is carried out at a temperature substantially the same as the boiling point of the benzene.

* * * * *